3,582,388
Patented June 1, 1971

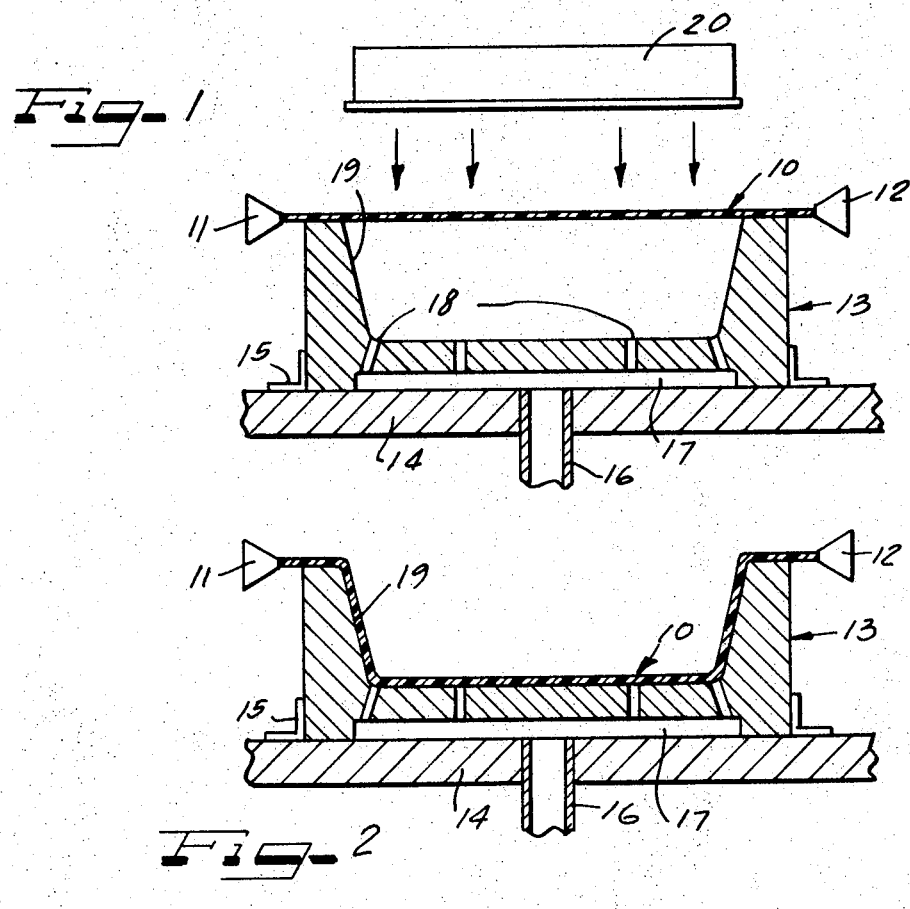

3,582,388
RIGIDFIED SYNTHETIC RESIN ARTICLE AND METHOD FOR MAKING SAME
Vance A. Stayner, Wauconda, Ill., assignor to Federal-Huber Corp., Chicago, Ill.
Filed June 24, 1968, Ser. No. 739,429
Int. Cl. B44d 1/08, 1/12
U.S. Cl. 117—27                                 11 Claims

ABSTRACT OF THE DISCLOSURE

Method for the production of rigidified synthetic resin articles, particularly based upon acrylonitrile-butadiene-styrene (ABS) resins and acrylic resins, wherein glass fibers are deposited on a relatively thin sheet of the resin, and bonded thereto by means of a bonding composition including an unsaturated polyester resin containing an inert organic solvent diluent which renders the surface of the sheet more receptive to the polyester bonding resin and promotes molecular adhesion between the bonding resin and the sheet, the composition also containing finely divided siliceous particles which distribute the stresses throughout the polyester resin matrix.

BACKGROUND OF THE INVENTION

Field of the invention

This invention is in the field of reinforcing plastic sheets so that relatively thin sheets can be provided with improved physical properties such as strength and impact resistance at low cost and very economically in terms of time and production rate.

Description of the prior art

In a commonly practiced spraying procedure for laying up glass fibers reinforced with unsaturated polyester resins, a smooth surfaced mold is first washed and then provided with a coating of wax over which there is sprayed a parting film usually consisting of polyvinyl alcohol. Then, a gel coat is sprayed over the parting film and finally the glass fibers and the bonding resin are applied by any of the variety of spraying systems such as the "Glas-Craft" gun. In this type of assembly, the glass fibers or rovings are dispersed in a spray of liquid issuing from the gun orifices, the liquid containing a polyester bonding resin, a catalyst and a solvent. It is not uncommon for the spraying operation to take one to two hours to build up a sufficiently heavy deposit to provide the required structural strength. The polyester resin then has to be cured and this takes an additional several hours. Consequently, a mold is tied up for a considerable length of time and production rates are necessarily low.

Some attempts have been made to spray on glass fibers and the polyester bonding resin onto sheets of synthetic resins. However, these attempts have not heretofore been successful because of the shrinkage properties of the polyester bonding resin. When the resin sets, it may shrink by a factor of 10% or so and this large amount of shrinkage puts excessive stresses into the underlying sheets of resinous material which could cause buckling and other undesirable effects.

SUMMARY OF THE INVENTION

The present invention is directed to an improved method of bonding glass fibers to ABS or acrylic sheets through the medium of a curable polyester resin. In the practice of the present invention, I use a modified polyester coating composition which includes the usual unsaturated polyester resin and catalyst and also includes an inert organic solvent diluent. By "inert" is meant that the organic solvent is capable of dissolving the polyester but does not have any significant effect upon altering the curing time or the shelf life of the polyester resin composition. The solvent is also one which can render the surface of the plastic sheet being treated tacky, thereby substantially improving the molecular bonding which occurs between the polyester bonding resin and the surface of the resin sheet. The physical properties of the resulting composites are also improved in accordance with the present invention by including in the polyester bonding composition very finely divided siliceous particles, such as glass spheres which serve to distribute stresses throughout the matrix of the polyester bonding resin when the resin is set. As a result, I can now produce composite articles having the desired surface finish of the resinous sheet coupled with the improved physical properties imparted to it by the polyester resin bonding agent. Consequently, the present invention makes it possible to substitute a reinforced relatively thin acrylic sheet for a much more expensive thick sheet of acrylic resin while improving the physical properties and cutting down production costs. Furthermore, because the layup of glass fibers and bonding resin is relatively thin, only short curing times are involved, and the curing may occur at room temperature. This significantly reduces the cost and substantially increases the production rate possible with glass fiber reinforced resins.

The improved compositions of the present invention include the polyester bonding resin, a suitable catalyst, the inert organic solvent diluent as previously defined, and finely divided glass particles dispersed therein. The composition, through suitable control of viscosity and particle size of the glass particles can be used in conventional resin spraying equipment of the type normally used in applying polyester bonding resins and glass fibers.

The present invention is applicable to the manufacture of a large variety of articles such as bathtubs, containers, boats, canopies, structural members, furniture facings, and in fact all applications were weather resistance, strength and economy are principal considerations.

BRIEF DESCRIPTION OF THE DRAWINGS

FIG. 1 is a somewhat schematic view of a vacuum molding assembly which can be employed in the practice of the present invention;

FIG. 2 is a view similar to FIG. 1 but illustrating the sheet upon completion of the molding operation; and FIG. 3 is a greatly enlarged cross-sectional view of the composite article of the present invention after the bonded glass fibers and the finely divided siliceous particles have been applied to the vacuum formed sheet.

DESCRIPTION OF THE PREFERRED EMBODIMENTS

The base sheets used in accordance with the present invention are composed of either ABS resins or acrylic resins.

ABS resins are commercially available materials employing varying proportions of styrene, acrylonitrile and polybutadiene. An elastomeric or rubbery phase is dispersed into a styrene-acrylonitrile resin phase, the two phases being produced by either emulsion, bulk or suspension polymerization. The rubbery elastomeric phase can be composed of a variety of elastomers onto which styrene acrylonitrile resins have been grafted. The relationships of the various components can be controlled to take maximum advantage of a single property or a set of properties. For example, hardness is generally a linear function of the elastomer content. Other physical properties such as tensile strength, impact and heat distortion are improved by increasing the molecular weight. The chemical resistance, tensile strength and resistance to heat distortion improve with increasing acrylonitrile content, while the impact strength is lowered. Generally, the commercial products which are presently available and which can be used in the practice of the present invention contain about 10 to 25% by weight of butadiene-acrylonitrile copolymer with the balance being a styrene-acrylonitrile copolymer.

Any of the acrylic resins which are supplied commercially in the form of sheets can be used in the practice of the present invention. Generally, these resins are based upon methyl methacrylate. The methacrylate monomer is polymerized catalytically, with the application of heat, by means of the following reaction:

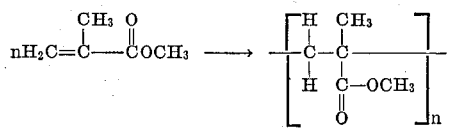

In addition to the straight acrylic, the impact modified acrylics can also be employed for the purposes of the present invention. For example, an acrylic-polyvinyl chloride alloy can be used, as can a copolymer of methyl methacrylate and alpha methyl styrene. In general, then, acrylic resins as a class are useful for the purposes of the present invention and it is their physical rather than their chemical properties which control for any given application.

Turning now to the drawings, FIGS. 1 and 2 show somewhat schematically a vacuum molding assembly which can be used for forming the sheet of the persent invention although it will be recognized that other methods of forming such as blow molding or the like can also be employed. In the apparatus shown in FIGS. 1 and 2, a thin sheet 10 composed of an acrylic resin is supported in clamped relation between a pair of clamps 11 and 12 over a mold assembly generally indicated at reference numeral 13. For the purposes of the present invention, very thin sheets can be used and are in fact preferred. While the thickness of the sheet can be up to about 0.2 inch, I prefer to use substantially thinner sheets ranging from about 0.020 to 0.060 inch.

The mold 13 is positioned on a table 14 and a sealing gasket 15 is used to prevent air leakage about the mold. A vacuum line 16 communicates with a vacuum manifold 17 located beneath the bottom of the mold, and a plurality of passages 18 communicate the manifold 17 with the molding cavity 19. A heater such as a radiant heater 20 is employed to preheat the sheet to molding temperature. Of course, other means of preheating can also be used such as passing through an oven.

Upon the application of the vacuum through the line 16, the preheated sheet 10 is drawn into conformity with the molding cavity 19 as is illustrated in FIG. 2. As the plastic sheet contacts the mold cavity 19, it cools and soon becomes rigid enough to be lifted from the molding cavity.

The next step consists in laying the glass fiber mat onto the preformed sheet, preferably by simultaneous deposition of the glass fibers and bonding agent by means of the well known Glas-Craft type gun. This step is preferably preceded by washing of the sheet with acetone in order to remove surface films and to render the sheet substantially tacky to be receptive of the glass fiber-polyester resin bonding agent.

There are a large number of unsaturated polyester compositions sold as bonding agents for glass fibers. Polyester resins can be based upon unsaturated anhydrides and dibasic acids such as maleic anhydride and fumaric acids. They can be based upon saturated anhydrides and dibasic acids, employing materials such as phthalic anhydride, isophthalic acid, adipic acid, azelaic acid, sebacic acid, chlorendic acid, tetrabromophthalic acid, tetrachlorophthalic acid, hexachloro-octahydromethano napthalene dicarboxylic acid or nadic methyl anhydride. The glycols which have been used in the preparation of commercial polyesters include propylene glycol, dipropylene glycol, ethylene glycol, diethylene glycol, Bisphenol-A adduct, hydrogenated Bisphenol-A adduct, neopentyl glycol, and trimethyl pentanediol. The polyester resins can also include monomers such as styrene, diallyl phthalate, methyl methacrylate, vinyl toluene, triallyl cyanurate and chlorostyrene.

Usually the unsaturated polyesters sold in the market in syrup form are solutions of the linear polyester in a monomer. Such resins generally contain an inhibitor which prevents premature polymerization, and setting is accomplished by the injection of a peroxide catalyst usually a ketone peroxide which overcomes the inhibition effect.

The layup of glass fibers in accordance with the present invention can be done with the usual type equipment employing a spray gun into which is fed the polyester, a solvent, and a catalyst such as methyl ethyl ketone oxide. Glass fibers or rovings are wetted by the solution issuing from the orifice of the gun and are applied over the surface to be coated simultaneously with the binding components.

In accordance with the present invention, I employ a novel type of coating formulation which has been found to provide excellent strength properties and other physical properties without distorting the sheet. The basic ingredient of the coating composition is a unsaturated polyester resin of the type described previously, the resin having a viscosity of 500 centipoises or lower at room temperature. Particularly good results have been obtained through the use of the polyester resin known as 93–524 marketed by Reichold Chemical Company.

The catalyst used in accordance with the present invention can be any of the well known peroxide catalysts, particularly methyl ethyl ketone peroxide. This material is normally supplied as a 60% solution in dimethyl phthalate. Other ketone peroxide formulations such as "Aposet 707" and "Lupersol D–224" can also be used. These ketone peroxides are not shock sensitive and are almost completely non-flammable. They have virtually no odor and provide long gel times and short cure times. Generally, the concentration of catalysts in the new formulation will be on the order of 1 to 3%, with 2% being preferred.

Another component of the new formulation is an inert organic solvent diluent of which acetone is the best example presently available. This diluent should be relatively inert to the polyester in that it does not either accelerate or decelerate the setting reaction or significantly affect the shelf life. At the same time, it should have the ability to tackify or etch the surface of the sheet over which the glass fiber-polyester composition is to be applied. In the case of ABS resin sheets, I can use up to about 12% by volume of acetone although generally it will not be necessary to use more than about 1% by volume.

Another ingredient present in the coating composition consists of siliceous particles such as glass spheres in a very finely divided condition. The particle size should be small enough so that the particles are readily dispersed in the polyester resin vehicle as a uniform dispersion, and the particle size is sufficiently small to pass through the orifices of conventional spray guns used for the application of polyester resins. Generally, the particle size of the glass sphere should not exceed about 1000 microns and should preferably be on the order of 200 microns or so. The siliceous particles serve to distribute the stress throughout the matrix of the polyester resin and provide for improved impact and strength properties in the finished product. The glass beads should constitute about 1 to 20% by weight of the coating mixture (polyester, catalyst and diluent), and preferably from 1 to 10% by weight.

The formulation described above has been found to provide excellent adhesion to sheets of ABS or acrylic resins. Apparently, the exothermic reaction of setting the polyester prestresses the sheet to provide a better bond.

Any type of conventional glass fiber reinforcements can be used for the purposes of the present invention including chopped strands, rovings and milled fibers. The glass fibers typically comprise 30 to 60% by weight of the coating composition, and the polyester resin ingredients comprise the remaining 70 to 40% by weight.

FIG. 3 of the drawings illustrates a typical configuration of a finished product produced according to the present invention. The acrylic sheet 10 is coated with a matrix 21 of set polyester resin which serves to bond the glass fibers 22 and the individual glass particles 23 to the surface of the sheet 10. While the relative thickness of the applied coating will vary depending upon the ultimate use to which the article is put, the thickness of the polyester matrix may range from about one-half to three times the thickness of the underlying sheet.

SPECIFIC EXAMPLE

An acrylic sheet (Lucite 147) having a thickness of 0.060 inch was vacuum formed and coated with a polyester-glass fiber mixture by means of a "Glas-Craft" gun. The bonding mixture sprayed through the gun simultaneously with the glass fibers contained 2% by weight of methyl ethyl ketone peroxide, 1% by volume acetone and about 1% by weight of glass spheres having a particle size of about 200 microns. The balance was the aforementioned Reichold Chemical Company's polyester resin 93–524. The bonding resin was set in 30 minutes at room temperature. The resulting laminated article was found to be exceptionally strong, durable, and completely resistant to delamination.

From the foregoing, it will be understood that the process and compositions of the present invention provide improved bonding between a polyester resin-glass fiber composition and an underlying sheet whereby the sheet is substantially rigidified. The articles are easily produced with conventional equipment and present a substantial saving in cost as compared to structures of the prior art used for similar purposes.

It will be understood that various modifications can be made to the described embodiments without departing from the scope of the present invention.

I claim as my invention:

1. The method of reinforcing an acrylic resin which comprises applying to the surface of a sheet of said resin, glass fibers and a composition including a curable polyester bonding resin for said fibers, finely divided siliceous particles, and an inert organic solvent diluent for said polyester resin, said solvent being capable of rendering said surface more receptive to said polyester bonding resin, and setting the bonding resin to cause the same to become securely bonded to said surface.

2. The method of claim 1 in which said organic solvent diluent is acetone.

3. The method of claim 1 in which said siliceous particles are glass particles of a size not in excess of about 1000 microns.

4. The method of claim 1 in which said composition has a viscosity not in excess of 500 centipoises.

5. The method of claim 1 wherein said sheet has a thickness not exceeding 0.2 inch.

6. The method of claim 1 in which said setting is carried out at substantially room temperature.

7. The method of claim 1 in which the coating deposited on said sheet includes about 30 to 60% by weight of said glass fibers and 70 to 40% by weight of said composition.

8. The method of claim 1 in which said composition contains up to 12% by volume of acetone, and from 1 to 20% by weight of glass spheres.

9. A reinforced resin article comprising a backing sheet of an acrylic resin glass fibers, a cured polyester bonding resin molecularly bonded to said sheet and bonding said glass fibers thereto, and finely divided glass particles distributed throughout the polyester bonding resin matrix in sufficient amount to distribute the stresses therein.

10. The article of claim 9 in which said glass particles have a particle size not in excess of about 1000 microns.

11. The article of claim 9 in which said glass particles constitute up to 20% by weight of the bonding resin.

References Cited

UNITED STATES PATENTS

| | | | |
|---|---|---|---|
| 2,873,226 | 2/1959 | Davies et al. | 161—195 |
| 3,356,253 | 12/1967 | Wimmer | 220—83 |
| 2,850,421 | 9/1958 | Thompson | 117—126GR |
| 3,276,895 | 10/1966 | Alford | 117—26 |
| 3,340,083 | 9/1967 | Robitschek | 117—126GR |

FOREIGN PATENTS 904,763    8/1962    Great Britain.

WILLIAM D. MARTIN, Primary Examiner

R. M. SPEER, Assistant Examiner

U.S. Cl. X.R.

117—126, 138.8; 161—194